United States Patent Office 3,538,429
Patented Nov. 3, 1970

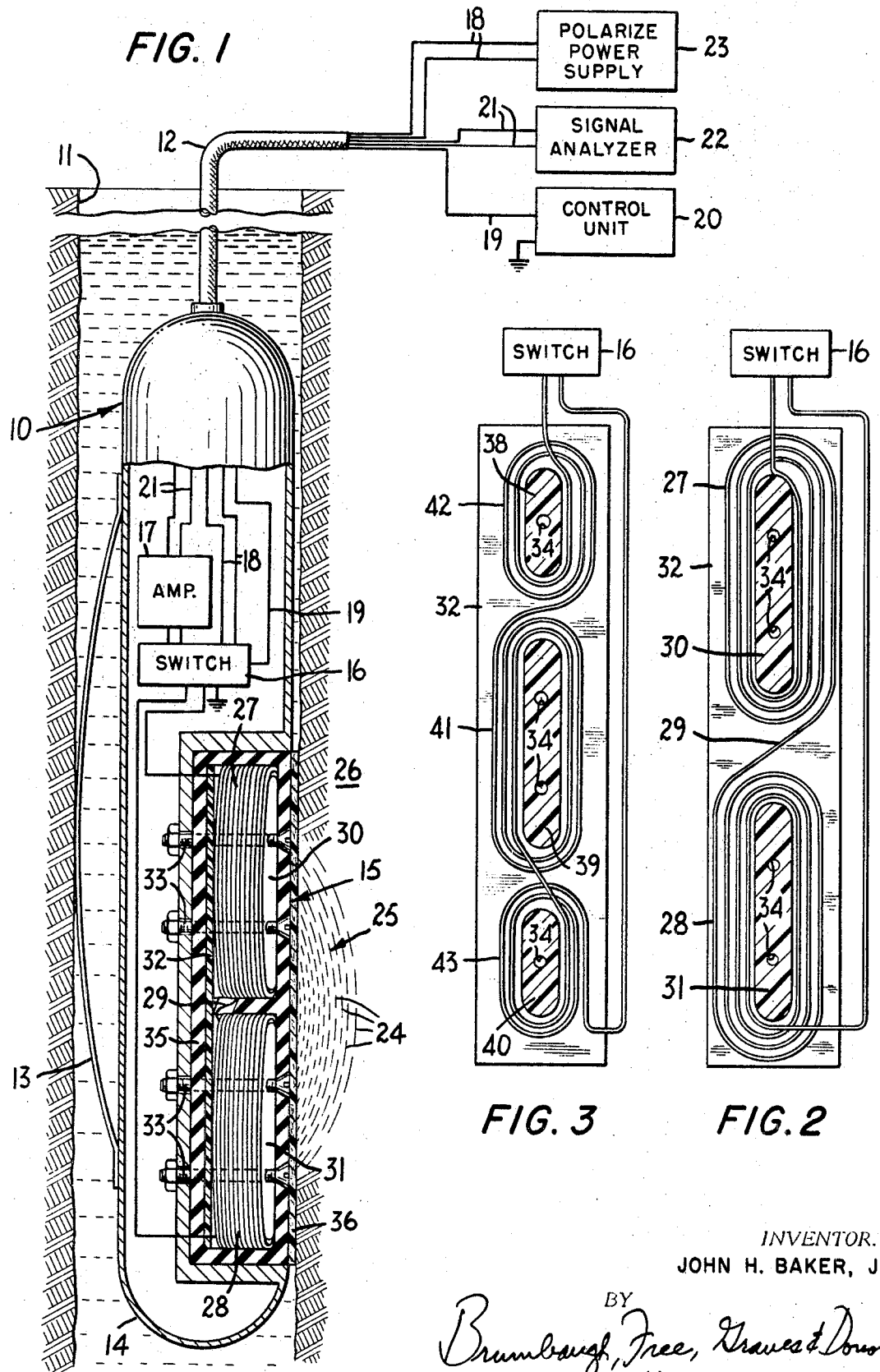

3,538,429
COIL ASSEMBLY FOR NUCLEAR MAGNETISM
WELL LOGGING
John H. Baker, Jr., Houston, Tex., assignor to Schlumberger Technology Corporation, Houston, Tex., a corporation of Texas
Filed Dec. 1, 1966, Ser. No. 598,369
Int. Cl. G01n 27/78
U.S. Cl. 324—.5                                7 Claims

ABSTRACT OF THE DISCLOSURE

An instrument for nuclear magnetism logging, according to the exemplary embodiments, comprises a housing which can be lowered into a well bore and a coil assembly carried by the housing and arranged to be urged into engagement with the well bore wall. The coil assembly includes at least two coils mounted on an elongated non-magnetic, vertically disposed support member with their axes extending substantially perpendicular to the well bore wall and spaced vertically from each other. The coils are electrically connected to each other in series, and they are connected and wound such that currents of the same phase induced in them tend to be cancelled.

---

This invention relates to nuclear magnetism well logging apparatus and, more particularly, to a new and improved coil arrangement for such apparatus enabling more accurate detection of nuclear magnetism signals in a well.

In nuclear magnetism well logging, the presence of gyromagnetic nuclei which are relatively free to move is determined by inducing synchronous precession of the nuclei about parallel axes. Usually, nuclear magnetism logging in a well bore is used to discover the presence of hydrogen nuclei or protons in fluid media, such as water or oil, within the formation adjacent to the well bore. For this purpose, a strong magnetic field is applied to the formation tending to polarize or align the free protons in parallel directions. Thereafter, the strong field is terminated, leaving a weak field which may be the earth's magnetic field and the protons tend to precess in synchronism about axes parallel to that field.

This synchronous precession of protons in an adjacent formation will induce A.C. signals in a coil disposed in the well bore and information may thereby be obtained regarding the content and type of proton containing fluid in the formation. The magnitude of these induced signals, however, is very small and their duration is quite short. Moreover, other alternating type signals induced in the coil resulting, for example, from harmonics of 60-cycle ground currents associated with electrical power lines may be of the same order of magnitude or even greater than that of the precession signal so that they tend to obliterate it.

Accordingly, it is an object of the present invention to provide a new and improved nuclear magnetism well logging instrument which overcomes the above-mentioned difficulties of present systems.

Another object of the invention is to provide a new and improved coil assembly for nuclear magnetism well logging having improved response to precession of protons in the adjacent formation and, at the same time, a reduced response to interfering signals.

These and other objects of the invention are attained by providing a coil arrangement including at least two oppositely wound coil components with winding arrangements balancing each other. Preferably, the product of the number of turns and the area enclosed by the turns for the oppositely wound components is identical. Moreover, the coil components are positioned in the logging instrument with vertically spaced axes extending substantially perpendicularly to a surface which is adapted to engage the well bore. In addition, the coil components are preferably elongated in the vertical direction and they are mounted on a support providing cores and a backing of non-magnetic material, such as a plastic material, the entire assembly being sealed by a layer of fluid impervious material. In one embodiment, two identical vertically spaced oppositely wound components are provided while, in another embodiment, a central coil component wound in one direction is flanked by two coil components above and below which are wound, in the opposite direction, each having half the product of area turns as the central component.

Further objects and advantages of the invention will be apparent from a reading of the following description in conjunction with the accompanying drawings, in which:

FIG. 1 is a schematic view in elevation partly broken away illustrating a representative well logging instrument arranged according to the invention;

FIG. 2 is a schematic front view of the coil assembly used in the instrument of FIG. 1, showing the circuit arrangement of the coils; and FIG. 3 is a schematic front view of the coil assembly used in another embodiment of the invention, showing the circuit arrangement of the coils.

In the embodiment of the invention illustrated in FIG. 1, a well logging instrument 10, suspended in a well bore 11 by a multiconductor cable 12, is urged against one wall of the bore 11 by a conventional bow spring 13. The instrument 10 includes a pressure-resistant non-magnetic metal housing 14 and, affixed to the housing in position to engage the wall of the well, is a coil assembly 15 arranged in the manner described below. If desired, rather than being mounted directly on the instrument housing, the coil assembly 15 may be supported on a shoe member adapted to be extended away from the housing to engage the wall of the bore.

Within the instrument housing 14, the conductors from the coil assembly lead to a switch unit 16 arranged to connect them either to an amplifier 17 or to two cable conductors 18 in response to control signals received on another cable conductor 19 from a control unit 20 at the surface of the earth. Two further cable conductors 21 connect the amplifier 17 to a signal analyzer 22 at the surface, the conductors 18 being connected to a polarized power supply 23 adapted to supply direct current to the coil assembly to produce a strong polarizing field 24 passing through a region of interest 25 in the earth formation 26 adjacent to the well bore.

In accordance with the embodiment of the invention shown in FIGS. 1 and 2, the coil assembly 15 comprises two coil members 27 and 28 which are wound in an opposite manner as illustrated in the schematic diagram of FIG. 2 but are otherwise identical as to structure, number of turns, and area encompassed by the turns. For convenience, the coils may be connected together at their adjacent peripheral regions by a connection 29, the inner ends of the coils being joined to the conductors leading to the switch 16. As illustrated in the drawings, both coils are elongated in the vertical direction for greater field concentration, the height to width ratio being, for example, about 3 to 1. Moreover, the coils are supported with their axes perpendicular to the wall of the bore 11 against which the instrument is urged by the spring 13. In addition, the coils are provided with non-magnetic cores 30 and 31 affixed to a non-magnetic backing plate 32 which provides support for the assembly, the entire assembly being affixed to the instrument housing by non-magnetic bolts 33 extending through openings 34 in the cores and backing plate. Cores 30 and 31 and backing plate 32 may be constructed of a tough plastic material such as epoxy-impregnated laminated fiberglass cloth. Alternatively, a non-magnetic stainless steel can be used. Finally, to make the coil assembly watertight at the high fluid pressures occurring in well bores, the entire assembly 15 is coated with a layer 35 of sealing material, such as rubber or neoprene, and, to prevent abrasion and provide a tough wall-engaging surface, a protective outer covering 36, consisting, for example, of fiberglass cloth layers laminated with an epoxy resin, is mounted on the front of the assembly.

In operation, the switch unit 16 is first arranged to supply polarizing power from the supply 23 to the coil assembly 15 to produce a strong magnetic field 24 in the region of interest 25. After the polarizing field has been terminated and the signal analyzer 23 is connected to the coil assembly by way of the amplifier 17, the free protons in the region 25 tend to precess in synchronism about the axes parallel to the earth's magnetic field which is at an angle to the polarizing field 24. This synchronous precession, causing the protons to be tilted first toward one coil 27 and away from the other coil 28 and then toward the other coil 28 and away from the first coil 27, induces precession frequency signals of opposite phase in the two coils which add together by reason of the coils being oppositely wound. Consequently, the precession signal applied to the conductors 21 is greater than it would be if only one of the coils 27 and 28 were included in the assembly.

On the other hand, interfering alternating-current electromagnetic signals resulting, for example, from harmonic components of 60-cycle electrical power line ground currents flowing through the earth tend to influence the two coils 27 and 28 equally in the same direction, producing signals of the same phase, the two coils being identical in structure. Because the coils are oppositely wound, however, the equal potentials induced in them by such signals having the same phase tend to cancel out, producing a smaller signal in the conductors 21 then would be the case if the assembly included only one coil. By virtue of this unique arrangement, therefore, the signal to noise ratio of the precession signal detecting system is substantially increased, assuring greater accuracy of the results obtained from an analysis of the signals.

The same advantages may be obtained with the balanced coil arrangement shown in FIG. 3. In this case, three elongated non-magnetic core members 38, 39 and 40 are mounted in vertical alignment on the backing plate 32, the cross-sectional area of the central core 39 being twice that of each of the upper and lower cores 38 and 40. Moreover, the central core supports a coil 41 which is wound in the opposite direction with respect to two coils 42 and 43 supported on the core members 38 and 40, respectively. Each coil has the same number of turns and inasmuch as the outer coils each enclose half the area of the central coil, the total of the product of area and turns is equal for the two directions of winding.

I claim:

1. An instrument for nuclear magnetism logging comprising a housing adapted to be lowered into a well bore, a polarizing and detecting coil assembly supported by the housing for engagement with the wall of the well bore and including a non-magnetic vertically disposed support member and first and second coil means mounted on the support member and having parallel vertically spaced axes extending substantially perpendicular to the wall of the bore for polarization of nuclei in the formations surroundng the well bore and detection of signals induced thereby, each of the coil means including a coil which is elongated in the vertical direction, the coil means being electrically connected to each other in series, the respective coil means being connected and being wound so that currents of the same phase induced in the coil means tend to be cancelled, urging means for urging the coil assembly against the wall of the well bore, and switch means for electrically connecting both coil means of the polarizing and detecting coil assembly either to a polarizing power source or to a signal analyzing circuit for analyzing signals induced in the coil means by action of nuclei in the formations surrounding the well bore.

2. An instrument according to claim 1 including means for rigidly attaching the coil assembly to the housing.

3. A coil assembly according to claim 1 wherein the non-magnetic support member comprises a non-magnetic backing plate supporting non-magnetic core elements extending into the openings within the first and second coil means, respectively.

4. A coil assembly according to claim 1 including a fluid-impervious layer of sealing material enclosing the support member and the coil means.

5. A coil assembly according to claim 1 wherein the first and second coil means comprise two coils of substantially identical structure and number of turns.

6. A coil assembly according to claim 1 wherein the dimension of each elongated coil is the direction of elongation is approximately three times the dimension in the direction across the coil.

7. Apparatus including a coil assembly for nuclear magnetism well logging comprising a non-magnetic elongated support member adapted to be carried by an instrument lowered in a well bore, first and second coil means mounted on the support member with parallel axes spaced in the direction of elongation of the member, means electrically connecting the first and second coil means to each other in series, the connections being arranged and the windings being oriented so that currents of the same phase induced in the coil means tend to be cancelled, wherein the first coil means comprises a first coil having a selected product of turns and enclosed area, and the second coil means comprises a pair of coils disposed on opposite sides of the first coil having a total product of turns and enclosed area equal to the selected product and means to alternately energize said coil means to cause polarization of the nuclei surrounding the well bore and to detect signals induced in the coil means by the action of the nuclei.

References Cited

UNITED STATES PATENTS

| 3,004,211 | 10/1961 | Anderson | 324—0.5 |
| 3,004,212 | 10/1961 | Coolidge | 324—0.5 |
| 3,048,773 | 8/1962 | Brown | 324—0.5 |
| 3,188,556 | 6/1965 | Worthington | 324—0.5 |
| 3,289,072 | 11/1966 | Schuster | 324—0.5 |

RUDOLPH V. ROLINEC, Primary Examiner

M. J. LYNCH, Assistant Examiner